Dec. 10, 1963   J. A. KUECKEN   3,114,147
AIRCRAFT COLLISION WARNING SYSTEM
Filed Aug. 4, 1959   2 Sheets-Sheet 1
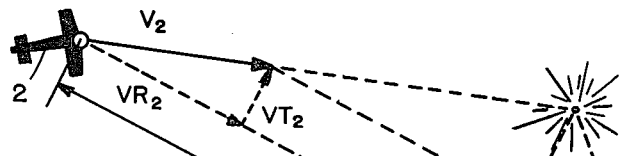
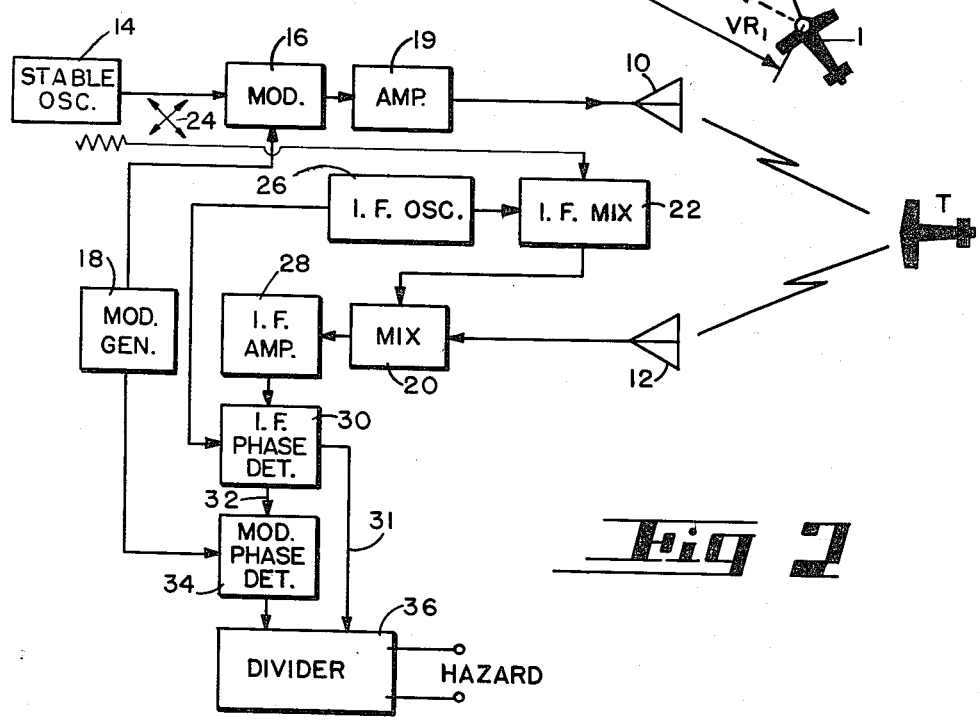
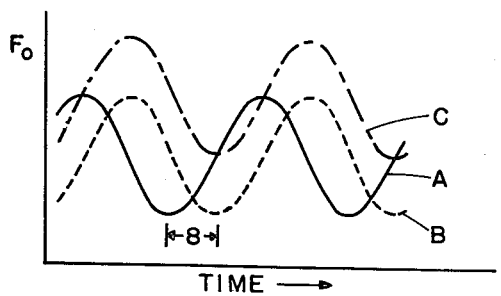
INVENTOR.
JOHN A. KUECKEN.
BY
ATTORNEYS.

INVENTOR.
JOHN A. KUECKEN.

United States Patent Office 3,114,147
Patented Dec. 10, 1963

3,114,147
AIRCRAFT COLLISION WARNING SYSTEM
John A. Kuecken, Cincinnati, Ohio, assignor to Avco Corporation, Cincinnati, Ohio, a corporation of Delaware
Filed Aug. 4, 1959, Ser. No. 831,571
8 Claims. (Cl. 343—7)

This invention concerns an airborne radar system for indicating the presence and for determining the collision hazard of an intruding aircraft.

The advent of high speed modern aircraft and the ever-increasing density of air traffic has made it increasingly important that some system for prevention of air-to-air collisions be incorporated in aircraft. Although severe traffic conditions exist in the vicinity of all major cities, and although there have been many tragic air disasters, no satisfactory system for the avoidance of air-to-air collisions has yet been devised. By means of this invention I propose to overcome the problem of air-to-air collisions with the use of a novel radar, the transmitted and reflected signals of which provide all the information necessary to detect and to evaluate a collision hazard in a single sweep, and to provide suitable warning for the aircraft pilot.

Generally, this invention comprises a frequency-modulated radar transmitter which is swept sinusoidally about a median frequency by a modulation generator. In accordance with known principles, the signal echoes from a stationary target are a frequency-modulated wave identical to the transmitted wave, but with the modulation envelope delayed by the round trip time to the target. If, in addition, the target is in motion, then the median frequency is offset by an amount proportional to the relative target velocity. By providing apparatus for determining both the phase shift of the modulation envelope and the change in median frequency, direct voltages representing range and relative velocity between the transmitter and the target may be obtained simultaneously.

As will be shown, the collision hazard for two airplanes flying at the same altitude may be defined as inversely proportional to the amount of time-to-collision, and thus equal to $V/R$ where R equals range and V equals relative velocity. Knowing the relative altitude and azimuth of an intruding aircraft, the collision hazard may be evaluated solely from the use of a sinusoidally swept frequency-modulated radar, and the pilot is provided with all the information required to perform the necessary evasive maneuvers.

It is the primary object of this invention to provide collision hazard evaluation information to the pilot of an aircraft by means of a single sinusoidally swept continuous wave.

Another object of this invention is to scan an intruding target with a sinusoidally swept radar beam, the reflections from said target simultaneously providing accurate information as to the range, relative velocity and relative height of the target to provide a warning of the collision hazard.

Still another object of this invention is to automatically determine the collision hazard with an intruding aircraft by means of apparatus for producing a first voltage proportional to range, a second voltage proportional to velocity, and for dividing the second voltage by the first voltage.

Still another object of this invention is to provide a method and apparatus for directing a sinusoidally swept beam at an intruding target, and for deriving from the reflections of said beam from said target a first voltage proportional to range, a second voltage proportional to velocity, and for dividing said second voltage with said first voltage to derive a voltage which is a function of said hazard.

A still further object of this invention is to provide a collision hazard warning to the pilot of an aircraft when the time-to-collision of an approaching intruding aircraft is less than a predetermined amount, and when the height of both aircrafts is approximately the same.

Other objects and a more complete understanding of the nature of this invention may be had from the following detailed description and from the accompanying drawings, in which:

FIG. 1 diagrammatically illustrates the mathematics of collision hazard;

FIG. 2 is a block diagram illustrating the basic elements of a preferred embodiment of my invention;

FIG. 3 is a curve showing the effects of range and velocity on a sinusoidally swept frequency-modulated radar as used in accordance with FIG. 2.

Figure 4:
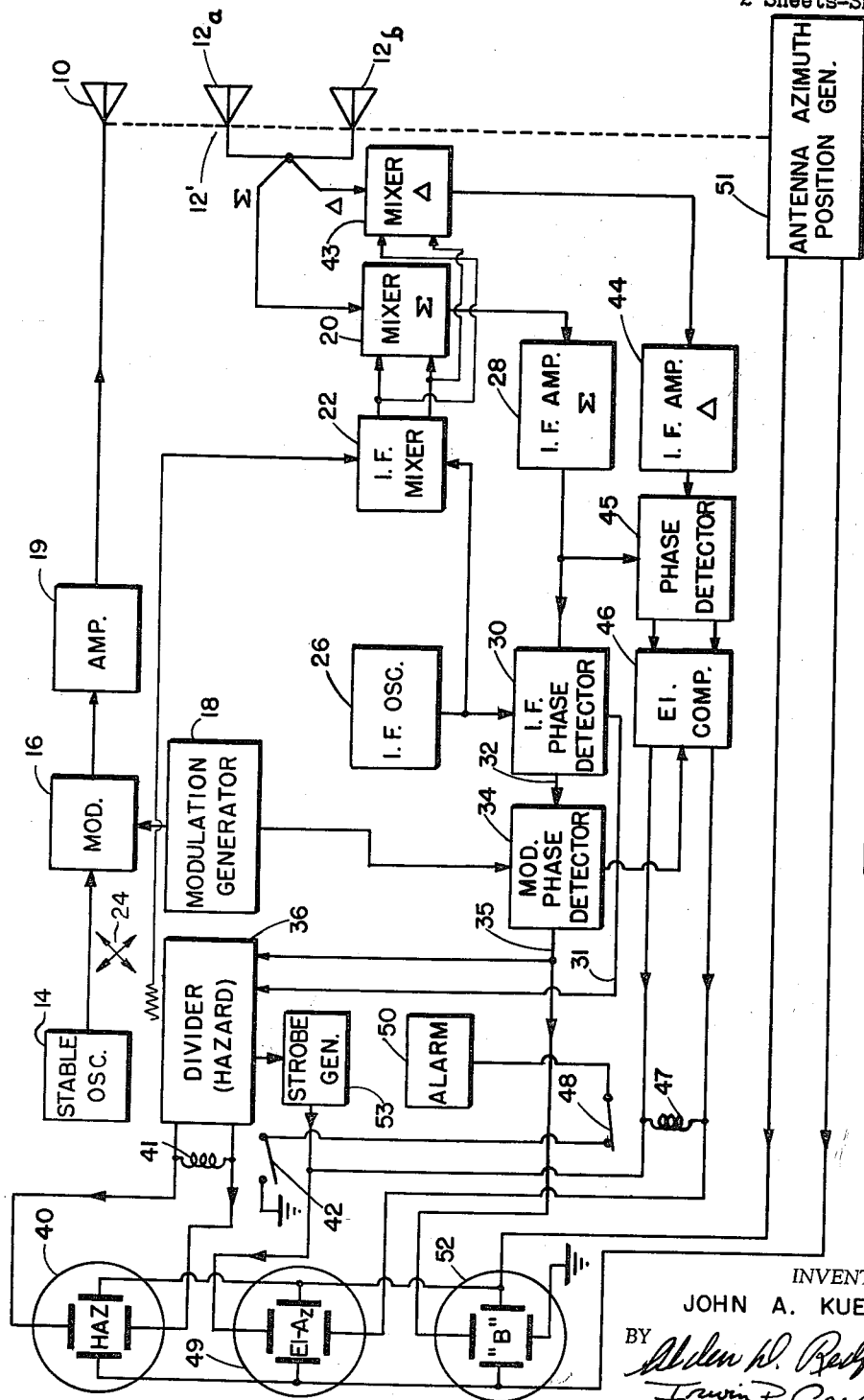
FIG. 4 is a block diagram illustrating a complete system embodying my invention.

The illustration in FIG. 1 is intended to show the collision problem in the most general manner wherein two airplanes 1 and 2 at the same altitude on non-parallel paths travel at different speeds on courses which will cross. It is seen that the velocity vectors of the two airplanes are resolved into two components, a range velocity ($V_{R1}$ and $V_{R2}$) and a tangential velocity ($V_{T1}$ and $V_{T2}$) which is normal to the range velocity component. Whenever the tangential velocities of the two airplanes are equal, the airplanes are on a collision course, and this situation is characterized by the fact that the relative bearings of the airplanes remain constant.

Now, it will be recognized that the collision hazard between two airplanes will be inversely proportional to the time that it takes for a collision to occur. That is to say, the hazard between two airplanes which are many miles apart and travelling at relatively slow speeds on a collision course will be far smaller than the hazard between two airplanes located nearby and travelling at high rates of speed. In accordance with this invention, the collision hazard between any two airplanes flying on a collision course is defined as inversely proportional to the time-to-collision and is equal to the relative range velocity $V_R$ divided by range R. Knowing the collision hazard, the pilot need know only relative altitudes and azimuth in order to perform the necessary evasive maneuvers. The basic system for providing collision hazard information in accordance with my invention is illustrated in block diagram form in FIG. 2, to which reference is now made.

As illustrated, the basic system includes a conventional directional radiating antenna 10 and a similar receiving antenna 12 arranged for sweeping 360 degrees in azimuth. While separate antennas are illustrated for convenience it is understood, of course, that a single antenna provided with the known T–R box may also be used and is considered equivalent. Further, as will become more clear in reference to FIG. 4, the antenna 12 may be of such construction that it is capable of yielding height information.

The system also includes a high frequency stable oscillator 14 for providing a carrier which is frequency-modulated in a modulator 16 with the relatively low frequency sine wave of a modulator generator 18. After amplification in a conventional amplifier 19, the sinusoidally swept, frequency-modulated output from amplifier 19 is applied to the antenna 10 for transmission into space. In the event the transmitted sinusoidally swept, frequency modulated signals strike a target, such as the intruding aircraft T, the signals are reflected back and are picked up in the receiver antenna 12. The reflected signals are then applied to the first input of a mixer 20, the second input of which is supplied with the output of an intermediate frequency mixer 22.

For the purpose of tracking in frequency, the first input of the intermediate frequency mixer 22 is provided with a reference signal derived from the stable oscillator 14 through a conventional directional coupler 24, and the second input of the mixer 22 is supplied with the signals from a fixed frequency oscillator 26 to provide a difference frequency for the input of mixer 20. In effect, the output from the mixer 22 is the local oscillator signal of the system, and since it is derived by beating the output of the stable, fixed frequency oscillator 26 with a portion of the transmitter signal, it automatically tracks the transmitter frequency. The output of mixer 20, the frequency of which is the difference of the output frequency of mixer 22 and the reflected signal frequency, is then amplified in a fixed IF amplifier 28.

By reference to FIG. 3 it may be observed that the output of the IF amplifier 28 contains all the information necessary for determining the collision hazard, and this information is in a form which is readily usable without the introduction of errors. The curve A of FIG. 3 represents the sinusoidally swept carrier transmitted from the antenna 10 toward a target. Now if the target is stationary, then the modulation envelope of a reflected signal will be shifted horizontally along the time axis by an amount proportional to the time of transmission to the target and back, as indicated by the curve B. On the other hand, if the target is moving, then in addition to the horizontal displacement of the modulation envelope, there will also be a vertical shifting of the wave form due to the well-known Doppler effects.

By measuring the change in median frequency, that is, by determining the amount of vertical shift of the curve C in accordance with known techniques, one is able to determine the rate of change of range (relative velocity) of the target. Also, by measuring the phase shift, that is, the horizontal displacement of the curve C along the time axis, one is able to determine range to the target. At this point it should be recognized that this method is distinguished from the conventional frequency-modulated Doppler systems which use a linear sweep. In such systems the Doppler effect introduces a range error and, therefore, is not suitable for anti-collision apparatus of the type disclosed.

For the purpose of utilizing the range and velocity information inherent in the curve C of FIG. 3, I apply the output of the IF amplifier 28 to one input of a phase detector 30, the other input of which is supplied with the output of the fixed frequency oscillator 26. The phase detector 30 yields (at 31) a direct current voltage proportional to the difference in frequency between the IF oscillator 26 and the IF amplifier 28, this difference being proportional to the vertical shift of the curve C with respect to the curve A. The IF phase detector 30 also yields (at 32) the modulation envelope of the reflected signal. The IF phase detector 30 may be a Foster-Seeley type discriminator having conventional means for separating the alternating current components from the direct current component.

The output of the modulation generator 18 and the modulation envelope from the phase detector 30 are compared in the modulation phase detector 34, the direct voltage output of which (at 35) is proportional to the horizontal displacement (the phase shift) of the curve B with respect to the curve A. The direct voltage outputs at 31 and 35, representing velocity and range, respectively, are then applied to a conventional computer 36 capable of performing a dividing operation wherein range is the denominator and velocity is the numerator. Therefore, the output from the computer 36 represents the collision hazard, a factor inversely proportional to the time-to-collision.

While the system illustrated to this point in FIG. 2 is capable of determining the collision hazard of an intruding aircraft, it is not capable of distinguishing between intruding aircraft at different altitudes. Obviously, an intruding aircraft in level flight at a much higher or lower altitude does not present a collision hazard, even though the paths of flight do cross in a projected horizontal plane.

The complete system illustrated in FIG. 4 incorporates the system of FIG. 2 but also includes apparatus yielding relative height information to enable a pilot to determine the real extent of the hazard.

The system illustrated in FIG. 4 comprises the stable oscillator 14, modulator 16, modulator generator 18, and power amplifier 19 for supplying the transmitting antenna 10 with a sinusoidally swept, frequency-modulated wave for transmission. However, in lieu of the receiving antenna 12 illustrated in FIG. 2, the complete system illustrated in FIG. 4 incorporates a conventional phase or amplitude comparison angle-of-arrival measuring antenna 12', commonly referred to as a monopulse type of antenna, having receiving elements 12a and 12b for deriving relative height information in a manner known to the art, energy reflected from a target to the antenna elements 12a and 12b generating two out-of-phase components, sigma ($\Sigma$) and delta ($\Delta$). A prior-art antenna of the type which may be used for the antenna 12' is shown in an article by R. M. Page in the I.R.E. 1955 Convention Record, part 8, page 132.

For the purpose of deriving the collision hazard, the sigma component of the monopulse antenna 12' is applied to the first input of the IF mixer 20, the second input of which is supplied with the output of balanced modulator or mixer 22. For the purpose of tracking in frequency, a reference signal is coupled from the oscillator 14 by means of the directional coupler 24 and mixed in the balanced modulator 22 with the output of the IF oscillator 26. It will be understood that in this embodiment of the invention the balanced modulator or mixer 22 must be of the Hausz single sideband suppressed carrier variety in order to obtain a response free of ambiguity. The output of the IF mixer 20, the frequency of which is the difference of the output frequency of the mixer 22 and the reflected signal frequency of component sigma, is then amplified in a fixed frequency amplifier 28.

As in the embodiment of FIG. 2, the output of IF amplifier 28 and the output of IF oscillator 26 are compared in the phase detector 30, thereby yielding at the output line 31 a direct current proportional to velocity. The phase detector 30 also yields at the output line 32 the modulation envelope of the reflected signal.

The output of the modulation generator 18 and the modulation envelope of the phase detector 30 are then compared in the phase detector 34 for yielding a direct current proportional to range. As before, the output (at 35) from the phase detector 34 and the output from the phase detector 30 are both applied to a computer or divider 36 capable of performing a dividing operation wherein the voltage proportional to range is the denominator and the voltage proportional to velocity is the numerator. The output from the divider 36 is, therefore, representative of the collision hazard and is presented on the scope of a conventional cathode-ray display 40. Since the output from divider 36 is connected to the vertical deflection plates of the cathode-ray tube 40, and since the horizontal deflection plates are connected to the output of the azimuth position generator 51, any aircraft detected by the radar will appear as an illuminated spot on the face of the cathode-ray tube, the horizontal position of the spot representing azimuth and the vertical position representing the degree of the collision hazard. A relay, including a winding 41 and contacts 42, is connected across the output of the divider 36 for a purpose hereinafter to be explained.

For the purpose of deriving relative height information the delta component is applied to the first input of IF mixer 43, the second input of which is supplied with the output of the balanced modulator or mixer 22. The output of the mixer 43 is then applied to an IF amplifier 44 which is matched to the amplifier 23. The output of amplifier 44 and the output of the IF amplifier 28 (which was used to amplify the sigma components) are then applied to the inputs of the phase detector 45, the output of which is a direct voltage representing the elevation angle of the intruding target.

For the purpose of converting the elevation angle into height, a portion of the output of detector 34 representing range is applied to one input of the elevation computer 46, the other input of which is supplied with the output of the phase detector 45. The elevation computer 46 is conventional and is provided for the purpose of computing the function $H = R \sin \alpha$ where $H$=relative height, $R$=range, and $\alpha$=elevation angle. The output of elevation computer 46 is then applied across the windings 47 of a relay having contacts 48, and also to the vertical deflection plates of a cathode-ray tube 49. It will be noted that the contacts 42 and 48 are connected in series with an alarm 50 which may be a bell or any other conventional warning device.

The contact 42 is normally biased by springs or other suitable means (not shown) into an open position, as illustrated, and is arranged to be closed when the current through the relay winding 41 exceeds a predetermined magnitude. The contact 48 is biased by any suitable means, such as springs (not shown), toward a closed position but is maintained in an open position by the current flowing through the relay winding 47 until such time as the current therein is reduced below a predetermined magnitude. Thus, if an intruding target is on a collision bearing, and if the collision hazard is high, the output of the divider 36 will be large and the contacts 42 will be closed. However, the alarm will not be sounded until such time as the relative height of the intruding aircraft drops below a predetermined amount. That is to say, the alarm 50 will not be operative until such time as the collision hazard is great and the intruding target is at a relatively close altitude.

The transmitting antennas 10 and the monopulse receiving elements 12a and 12b are mechanically coupled to a conventional antenna azimuth position generator 51, the output of which is applied to the horizontal deflection plates of the cathode-ray displays 40 and 49. In addition, a third cathode-ray display tube may be provided for supplying the pilot with range-azimuth information, and for this purpose the output of generator 51 is applied to the horizontal deflection plates, while the range output of the phase detector 34 is applied to the vertical deflection plates. Thus, on the display 40 the pilot is able to visualize the collision hazard; on the display 49 he is able to visualize the relative elevation and azimuth of the intruding target, while on display 52 is a conventional B-scope yielding azimuth vs. range information, all provided in a single sweep of the antennas.

For the purpose of providing the pilot with a visual warning of a collision hazard on the elevation azimuth scope 49, a conventional strobe generator 53 supplied with the output of the divider 36 may be used for marking the display 49 each time the hazard exceeds a predetermined amount, thus making the pilot aware of the existence of a collision hazard and, in addition, informing him of the relative height and azimuth of the intruding target.

While it is feasible to utilize the information derived from the various circuits of the complete system to automatically control the necessary evasive manuevers of an aircraft in the event it is on a collision course, this type of system is not recommended or preferred. The complete system disclosed in FIG. 4 has the advantage that it is an information-gathering system only, and it leaves decisions for evasion manuevers to the pilot of the aircraft with whom the responsibility lies. Furthermore, making the complete system automatic would add a complex computer which would multiply the problems beyond the present capabilities of the art.

It may be seen that the anti-collision warning system described herein provides an advantageous solution to the aircraft collision problem. The system described requires no changes to the intruding aircraft and is fully effective against all aircraft, whether or not equipped with similar systems; however, it may be desirable under some circumstances for many types of aircraft, such as jets, to be provided with small passive reflector targets for the purpose of reducing the required transmitter power for the system. The information gleaned from the equipment is presented to the pilot directly, thus eliminating the need for complex computers and permitting the handling of large numbers of aircraft simultaneously and assigning a hazard value to each. Furthermore, complete information on all intruding aircraft is presented on each sweep of the antenna.

It appears clear that various modifications and additions will at once become apparent to persons skilled in the art. It is intended, therefore, that my invention be limited only by the scope of the appended claims as interpreted in the light of the prior art.

What is claimed is:

1. In combination, a collision warning system comprising: a source of carrier frequency energy; a source of sinusoidal signal; a modulator for frequency-modulating said energy with said signal; means for radiating said frequency-modulated energy toward a moving target; means for receiving reflections of said energy from said moving target; means for comparing the median frequency of said radiated energy with said reflected energy, and for deriving a voltage proportional to the difference between the median frequency of said radiated energy and the frequency of said reflected energy; means for comparing the phase of said signal with the phase of the modulation signal of said reflected energy, and for deriving a voltage proportional to the difference therebetween; and means for deriving a warning voltage proportional to the ratio of said voltages.

2. The invention as defined in claim 1 and additional means for generating a voltage representing the azimuth of said target; and an indicator for displaying said voltage representing azimuth versus said warning voltage.

3. The invention as defined in claim 2 wherein said indicator comprises a cathode-ray tube.

4. In combination, a collision warning system comprising: a warning device operated by a voltage exceeding predetermined magnitude; a source of carrier frequency energy; a source of sinusoidal signal; a modulator for frequency-modulating said energy with said signal; means for radiating said frequency-modulated energy toward a moving target; means for receiving reflections of said energy from said moving target; means for comparing the median frequency of said radiated energy with said reflected energy, and for deriving a first voltage proportional to the difference between said median frequency of said radiated energy and the frequency of said reflected energy; means for comparing the phase of said source of signal with the phase of the modulation signal of said reflected energy, and for deriving a second voltage proportional to the difference therebetween; and means for deriving a third voltage proportional to the ratio of said first and second voltages; and means energizing said warning device with said third voltage, whereby said device is operated when said third voltage exceeds said predetermined magnitude.

5. The invention as defined in claim 4, and additional means for generating a fourth voltage representing relative height of said target, and for preventing operation of said warning device when said fourth voltage exceeds a predetermined magnitude.

6. In combination, an aircraft collision warning system comprising: a warning device; an energization circuit for said warning device; first and second series-connected switches connected in said energization circuit; means for operating said switches to activate said warning device, including a source of carrier frequency energy, a source of sinusoidal signal, a modulator for frequency-modulating said energy with said signal, means for radiating said frequency-modulated energy toward a moving target, means for receiving reflections of said radiated energy from said moving target, means for comparing the median frequency of said radiated energy with said reflected energy and for deriving a sinusoidal voltage superimposed on a direct voltage, said sinusoidal voltage being equivalent to the modulation signal of said reflected energy and said first direct voltage being proportional to the difference in frequency between the median frequency of said transmitted energy and the median frequency of said reflected energy, means for comparing the phase of said signals with the phase of the modulation signal of said reflected energy and for deriving a second direct voltage proportional to the difference therebetween, a computer for deriving a third voltage which is proportional to the ratio of said first voltage with respect to said second voltage, a first relay operating said first switch, said first relay being energized by said third voltage when said third voltage exceeds a predetermined magnitude, means for determining the relative elevation angle of said moving target with respect to the horizontal at said source of energy and for deriving a fourth voltage proportional to said angle, and a second relay for operating said second switch, said second relay being energized by said fourth voltage when said fourth voltage is less than a predetermined magnitude.

7. In combination, an aircraft collision warning system comprising: a source of carrier frequency energy; a source of sinusoidal signal; a modulator for frequency-modulating said energy with said signal; means for radiating said frequency-modulated energy toward a moving target; means for receiving reflections of said radiated frequency modulated energy from said moving target; a first mixer; a fixed frequency oscillator for generating an intermediate frequency; means for deriving a sample of said carrier frequency energy; means heterodyning said sample with said intermediate frequency output in said first mixer to derive from said first mixer a difference frequency output; a second mixer; means for heterodyning said difference frequency output with said reflected energy in said second mixer for deriving an output having a frequency which is the summation of said difference frequency and said reflected energy frequency; means for comparing the frequency output of said second mixer with the frequency output of said fixed frequency oscillator and for deriving a voltage proportional to the difference therebetween; means comparing the phase of said sinusoidal signal with the phase of said reflected energy modulations and for deriving a voltage proportional to the difference in phase therebetween; and means for deriving a warning voltage proportional to the ratio of said voltages.

8. The invention as defined in claim 7 and including: a warning device; means for activating said warning device when said warning voltage exceeds a predetermined amount; additional means for generating a height voltage proportional to the relative height of said target with respect to said source of energy; and means for preventing the activation of said warning device when said height voltage exceeds a predetermined amount.

References Cited in the file of this patent

UNITED STATES PATENTS 2,875,434     Lipinski et al. _____ Feb. 24, 1959

OTHER REFERENCES

"Heart of Anti-Collision System," by Holahan, Aviation Age, vol. 26, No. 6, December 1956, pages 80–85.